(12) United States Patent
Nasu et al.

(10) Patent No.: US 8,363,181 B2
(45) Date of Patent: Jan. 29, 2013

(54) BACKLIGHT DEVICE FOR DUAL-VIEW DISPLAY

(75) Inventors: Kousuke Nasu, Chu-Nan (TW); Hendrik Louwsma, Chu-Nan (TW)

(73) Assignee: Chimei Innolux Corporation, Chu-Nan (TW)

( * ) Notice: Subject to any disclaimer, the term of this patent is extended or adjusted under 35 U.S.C. 154(b) by 691 days.

(21) Appl. No.: 12/284,902

(22) Filed: Sep. 26, 2008

(65) Prior Publication Data
US 2009/0103008 A1 Apr. 23, 2009

Related U.S. Application Data

(60) Provisional application No. 60/995,717, filed on Sep. 27, 2007.

(30) Foreign Application Priority Data

Mar. 13, 2008 (JP) .................................. 2008-064257

(51) Int. Cl.
*G02F 1/1335* (2006.01)
(52) U.S. Cl. ............................... 349/64; 349/62; 349/96
(58) Field of Classification Search .................... 349/64, 349/62, 65, 96
See application file for complete search history.

(56) References Cited

U.S. PATENT DOCUMENTS

| | | | |
|---|---|---|---|
| 6,222,689 B1 * | 4/2001 | Higuchi et al. | 359/837 |
| 6,364,497 B1 * | 4/2002 | Park et al. | 362/627 |
| 2003/0117791 A1 * | 6/2003 | Kim | 362/31 |
| 2007/0052931 A1 * | 3/2007 | Kanatani et al. | 353/69 |

FOREIGN PATENT DOCUMENTS
WO WO-2005-071474 * 8/2005

* cited by examiner

*Primary Examiner* — Lauren Nguyen
(74) *Attorney, Agent, or Firm* — Liu & Liu

(57) ABSTRACT

The present invention provides a backlight for dual-view display, comprising: a light source; a light-guide plate, which allows the incoming of light from the light source and uniformly guides and diffuses the light; a diffusing sheet, which is placed between the light-guide plate and liquid crystal panel; two prism sheets, which are placed between the diffusing sheet and the liquid crystal panel; and a reflective sheet, wherein the face where the prism is formed on the prism sheet on the diffusing sheet side amongst the two prism sheets faces the diffusing sheet, and the prism axis (the ridge line of the prism) is placed as to be parallel to a longitudinal direction with respect to the liquid crystal screen; the face where the prism is formed on the prism sheet on the liquid crystal panel side faces the liquid crystal panel, and the prism axis (the ridge line of the prism) is placed as to be the same as the lateral directions with respect to the liquid crystal screen; the prism tip angle of the prism sheet on the diffusing sheet side is 80° to 95°, and the prism tip angle of the prism sheet on the liquid crystal panel side is 70° to 100°.

14 Claims, 17 Drawing Sheets

BACKLIGHT DEVICE FOR DUAL-VIEW DISPLAY

BACKGROUND OF THE INVENTION

1. Field of the Invention

The present invention relates to a backlight device used for an automotive dual-view display.

2. Description of the Related Art

Traditional displays provide good quality images for a plurality of observers who watch the display from multiple directions simultaneously. For example, the displays used in the airport, railway stations, arena . . . etc, are prefer to have high brightness at all angles even at a wide view angle.

On the other hand, it also exists a situation that the viewers need to view different images from the same display. For example, in an automobile, it is more convenient when the driver view the car navigation, the passenger on the passenger seat can view other images such as a movie from the same display. In order to fulfill such a demand, a dual-view display has been developed. Such dual-view display shows two different images simultaneously, and each of the images can only be viewed in specific angles.

FIG. 10 shows a conventional dual-view display according to the prior art. Such dual-view display is realized by a liquid crystal panel with a slit portion, e.g. the barrier 713, formed therein, where the liquid crystal panel has respective pixels for the left images and for the right images.

In JP Laid Open No. 2005-44642, a backlight device used for automotive liquid crystal display is disclosed. The structure of the disclosed backlight device is as the following. A lens A is located on a light-guide system, in such a way that the prism rows of the lens A are installed on a surface in contact with the light-guide system, and the prism rows are placed in a direction orthogonal to the long side of the light-guide system equipped with a light source. A lens B was located on the top of the lens A. The prism rows of the lens B, which are orthogonal to the prism rows of the lens A, are located on the opposite surface to the surface which is in contact with the lens A. FIG. 11 shows the luminance directivity characteristic of this backlight device, which shows the luminance is uniform in a range between −35° and +35°, i.e. an angle of 35° relative to the left and right from the front face, respectively. In other words, such liquid crystal display consisting of one screen is designed to display just one single image for the driving seat, the passenger seat and the rear seats.

In contrast to the above, the backlight device used for a dual-view display shows two different images respectively to the driving seat and the passenger seat by a liquid crystal display consisting of one screen. According to the above, the backlight device disclosed by JP Laid Open No. 2005-44642 shows a peak luminance level when looking from the front side, and shows a slightly deteriorated luminance while looking from the left and right sides, which is not suitable for a dual-view display. The backlight device for a dual-view display is required to have the peak luminance level in the directions of the driver seat and passenger seat but a low luminance level in the front center direction in order to reduce optical crosstalk of the left and right images. In addition, it is also necessary to decrease the reflection light from the windscreen, which interferes with the view of the driver during night-drive, since the dual-view display requires a narrow luminance directivity characteristic in a longitudinal direction.

Furthermore, WO/2005/071474 discloses a backlight device for a dual-view or multi-view display. As shown in FIG. 6c of WO/2005/071474, the backlight device is constructed by a pair of prism sheets which are disposed in such a way that the prism structures thereof are facing each other. For such configuration, since the tips of the prisms of one prism sheet are in contact with those of the other, the backlight device has a disadvantage of being easily damaged. In addition, in order to direct the partly-collimated light to the prism sheet, a light-guide capable of transmitting the collimated light is required.

SUMMARY OF THE INVENTION

The object of the present invention is to provide a high quality, damage-resistant backlight structure as the light source of the dual-view display, which shows a peak luminance level when looking from left and right sides, inhibits the luminance level in the front direction, and narrows the luminance directivity characteristic in the direction extending from the top to the bottom of the display, so as to reduce the optical crosstalk of the left and right images and to reduce the amount of reflecting light from the windscreen, which interferes with the view of the driver during night-driving.

The mentioned object is achieved by decreasing the prism tip angle of the prism sheet disposing on the diffusing sheet side, in a dual-view display as shown in FIG. 10, to a relatively small angle, e.g. to an acute angle which is smaller than that of the conventional one such as an angle of 155° to 172° disclosed by JP Laid Open No. 2005-44642. Comparing with the conventional ones, the prism tip angle of the prism sheet according to the present invention is ranged from 80° to 95° and thereby the mentioned object is easily achievable.

The structure of the present invention is as follows:

(1) A backlight device for a dual-view display, comprising: a light source; a light-guide plate guiding and diffusing a light from the light source; a diffusing sheet disposed between the light-guide plate and a liquid crystal panel; a first prism sheet and a second prism sheet disposed between the diffusing sheet and the liquid crystal panel, wherein the first prism sheet has a prism forming surface facing the diffusing sheet and the second prism sheet has a prism forming surface facing the liquid crystal panel; and a reflective sheet, which is characterized in that the first prism sheet has a prism axis parallel to a longitudinal direction of the liquid crystal screen and has a tip angle ranged from 80° to 95°, and the second prism sheet has a prism axis parallel to a lateral direction of the liquid crystal screen and has a tip angle ranged from 70° to 110°.

(2) The backlight device of (1), wherein the tip angle of the first prism sheet is ranged from 89° to 90°.

(3) The backlight device of (1), wherein the tip angle of the second prism sheet is ranged from 80° to 100°.

(4) The backlight device of (1), wherein the first and second prism sheets have a respective plane surface facing to each other, and either one or both of the surfaces are matte-finished.

(5) The backlight device of (4), wherein the surface of the first prism sheet is matte-finished.

(6) The backlight device of (1), wherein the dual-view display further includes a polarizer having a transmission axis, and the first prism sheet and the second prism sheet are disposed in such a way that the respective prism axes thereof are orthogonal to each other and are rotated an angle ranged from ±35' to ±45' with respect to the transmission axis of the polarizer.

(7) The backlight device of (6), wherein the polarizer is a polarizer of reflective type.

(8) A liquid crystal display device comprises the backlight device of one of (1) to (7).

(9) An automotive dual-view display using the liquid crystal display device of (8). The structure of the backlight device of the present invention is described with reference to FIG. 1. The backlight device of the present invention is disposed on a rear side of a dual-view liquid crystal panel. As shown in FIG. 1, the backlight device of the present invention is constructed by a light source 11 such as LEDs, a light-guide plate 12, a diffusing sheet 13, a first prism sheet 14, a second prism sheet 15, and a reflective sheet 16.

The prism forming surface of the first prism sheet 14 is facing the diffusing sheet 13, and is placed in such a way that the prism axis, i.e. the ridge line of the prism, is parallel to a longitudinal side of the liquid crystal screen. The second prism sheet 15 is placed above the first prism sheet 14, where the prism forming surface thereof is facing the LCD side, and the prism axis thereof is orthogonal to the prism axis of the first prism sheet 14.

Typically, the prism of the prism sheets is shaped as an isosceles triangle with a tip angle of 90°. In the present invention, however, two prism sheets having specific tip angles as mentioned above are used. Prism sheets of this kind may be selected and used from the commercially available products, such as BEF series produced by 3M, DIAART produced by Mitsubishi Rayon Co. Ltd.

FIG. 2 shows the luminance directivity characteristic of the prism sheets varying with different view angles, where both prism tip angles of the first prism sheet 14 and the second prism sheet 15 are 90°. In comparison with the conventional ones, the prism sheets of the present invention exhibit a peak luminance level at the right and the left, as shown in FIG. 2, The backlight device of the present invention is advantageous in the light-collimating property in the left and right directions and the high brightness, which is suitable for the dual-view display used in automotive liquid crystal display devices such as car navigation.

DETAILED DESCRIPTION OF THE INVENTION

The more preferable embodiments of the present invention will be described in detail as follows. However, these shall not be regarded as to limit the scope of the present invention.

Figure 1:
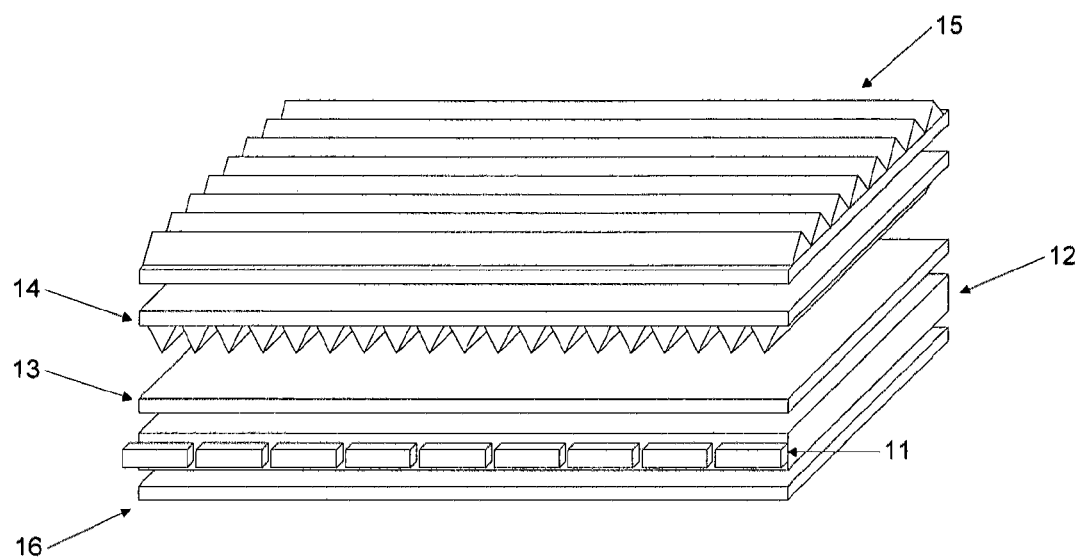
FIG. 1 is a schematic diagram showing the backlight device of the present invention.
Figure 2:
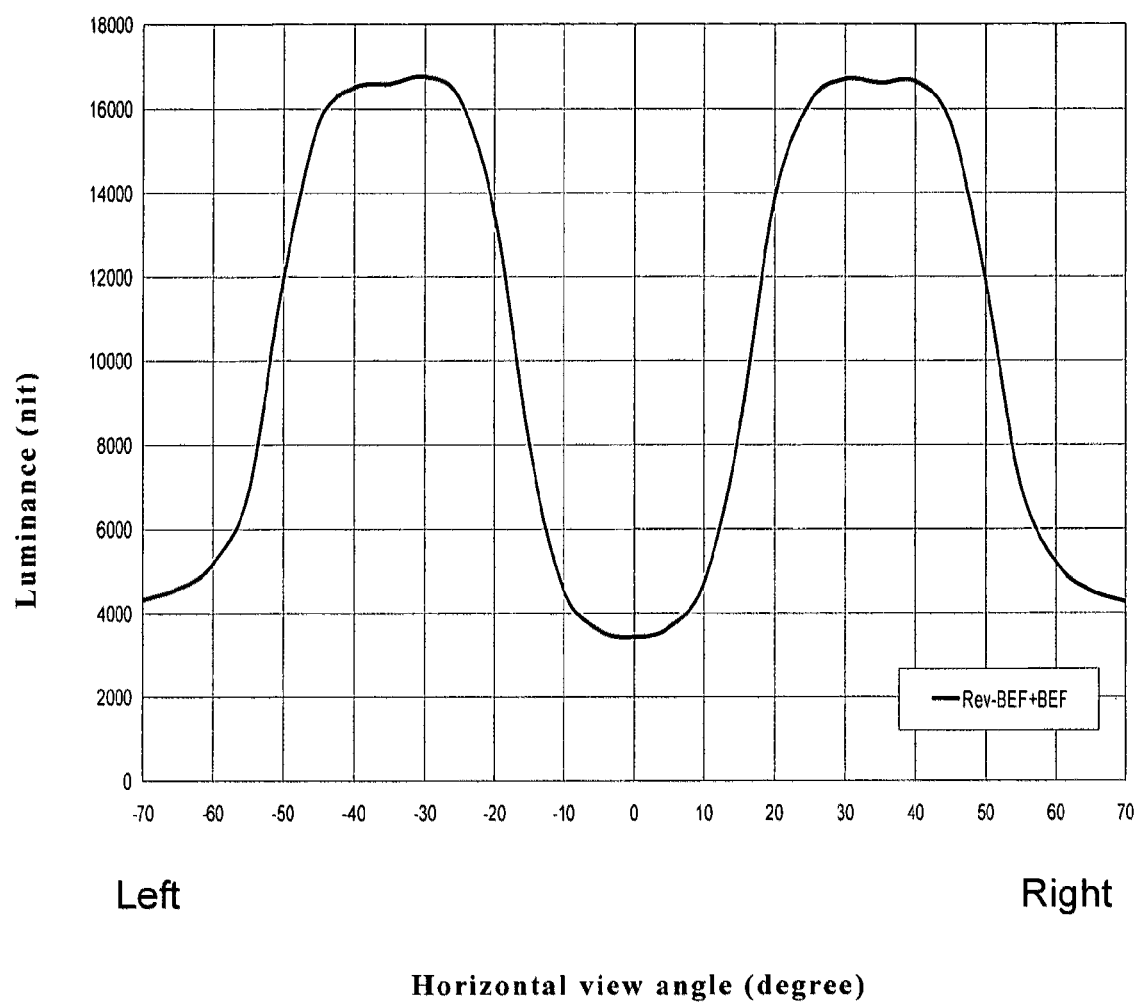
FIG. 2 is a graph showing the luminance directivity characteristic of the backlight device of the present invention.
Figure 3A:
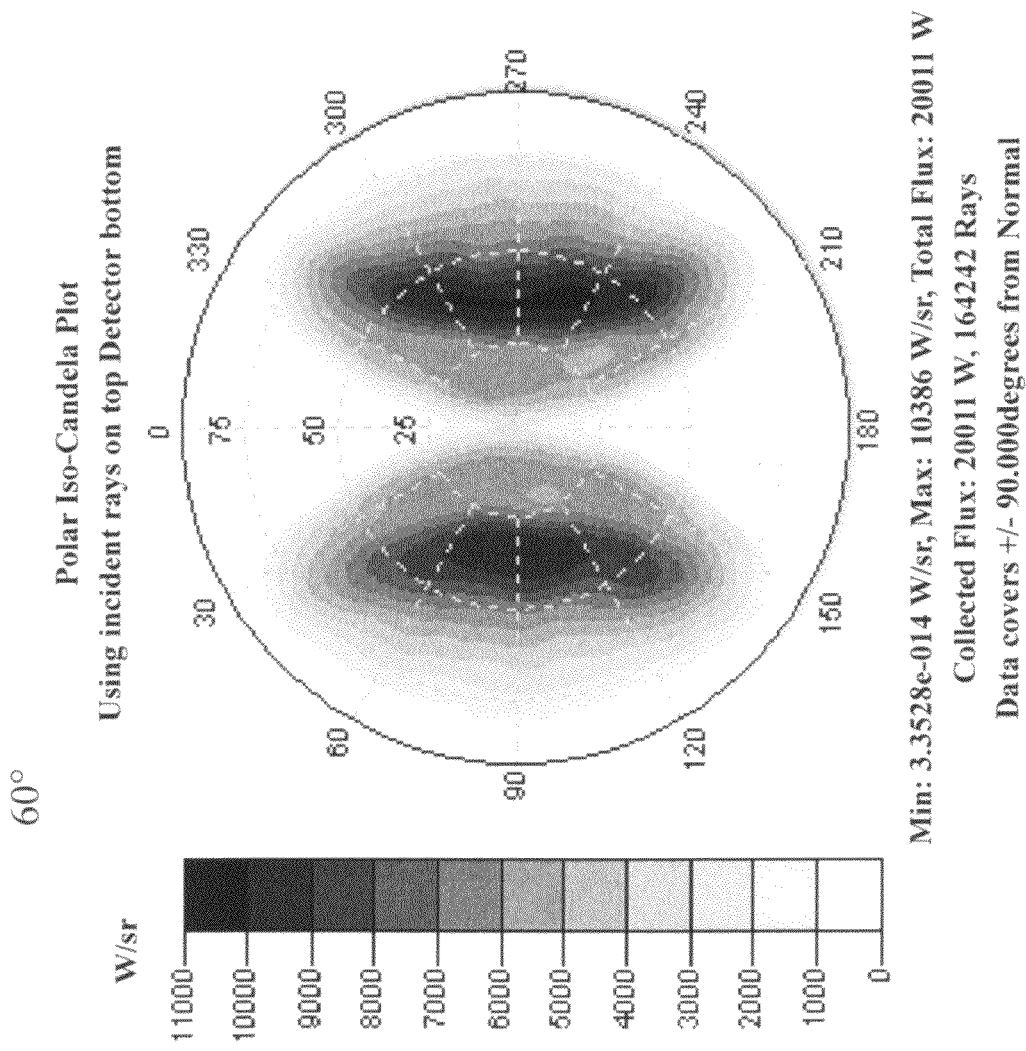
FIGS. 3A-3G are diagrams showing the influence on the luminance directivity characteristic of the prism angle of the second prism sheet.
Figure 3B:
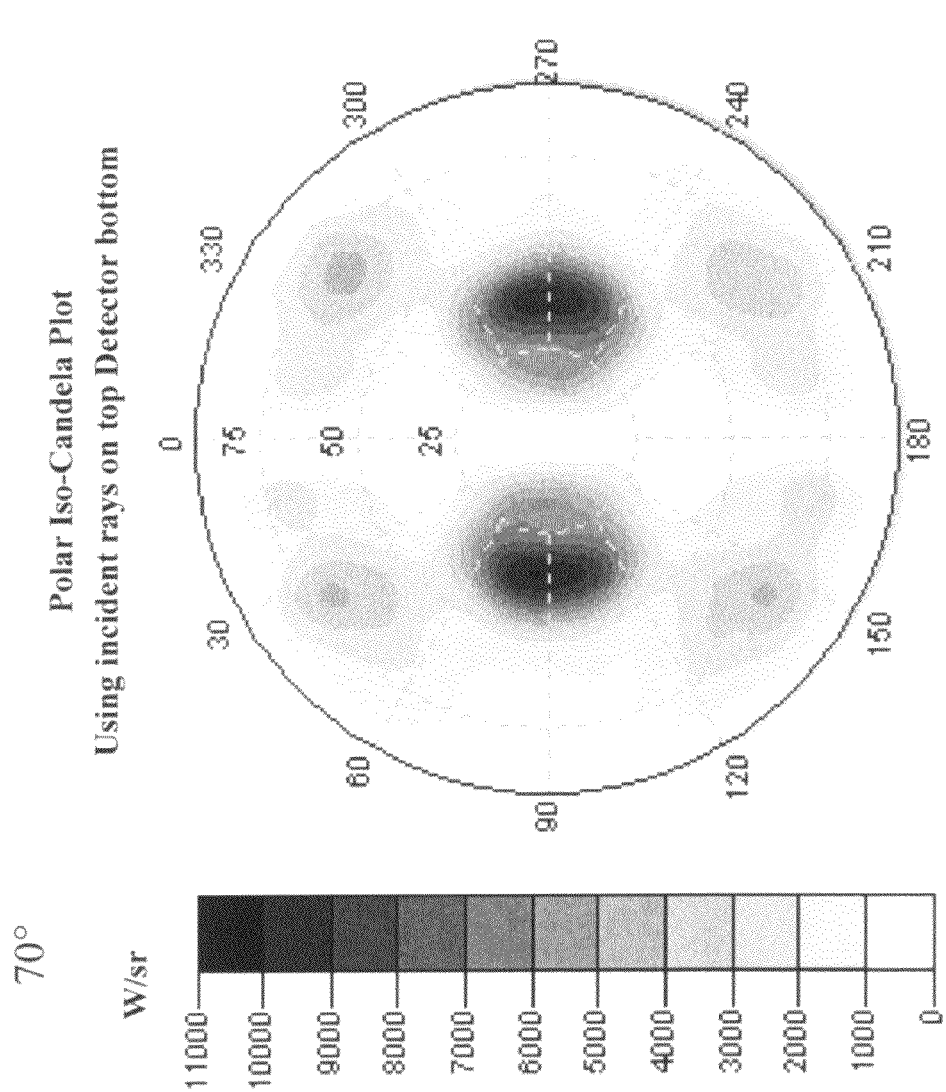
Figure 3C:
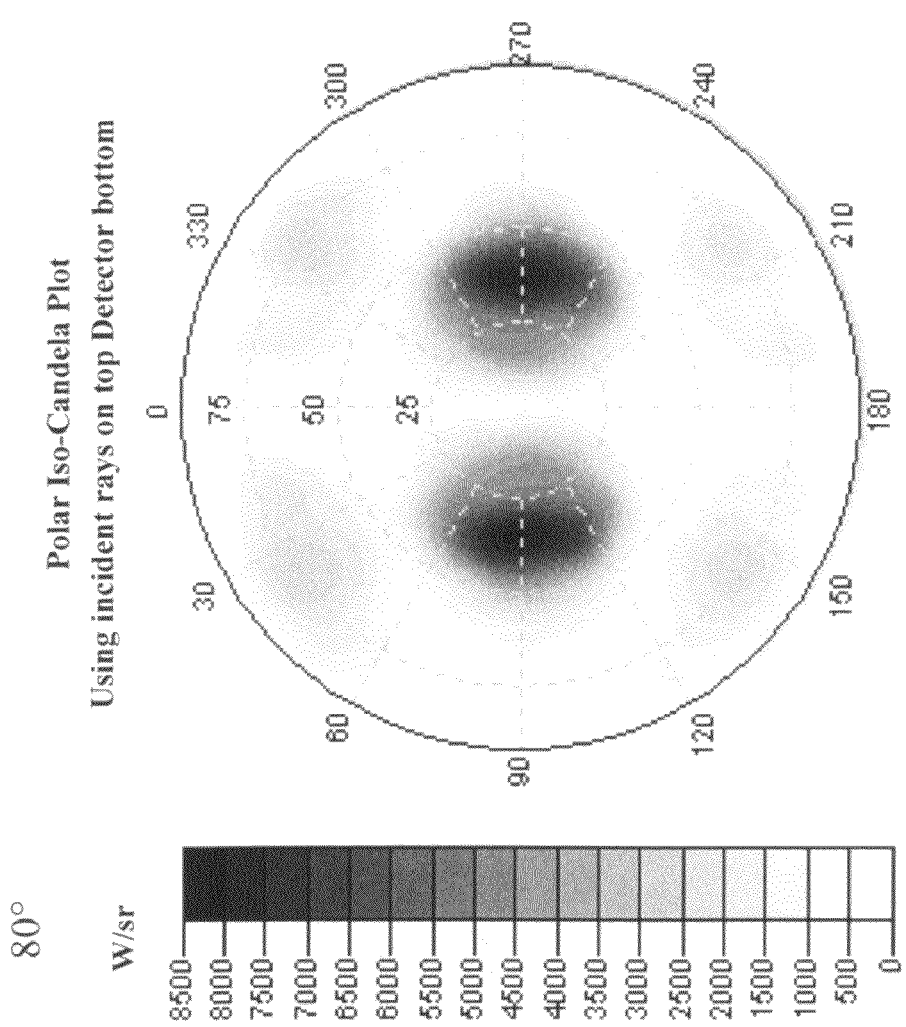
Figure 3D:
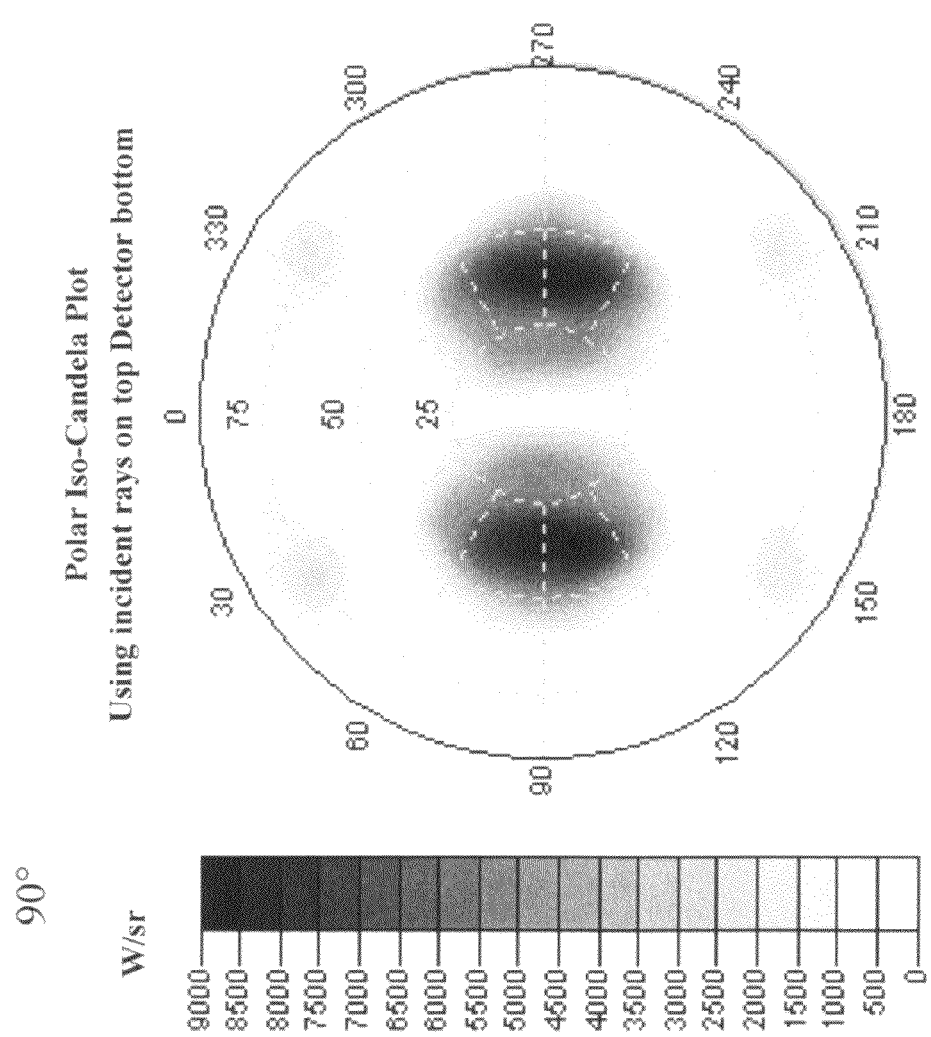
Figure 3E:
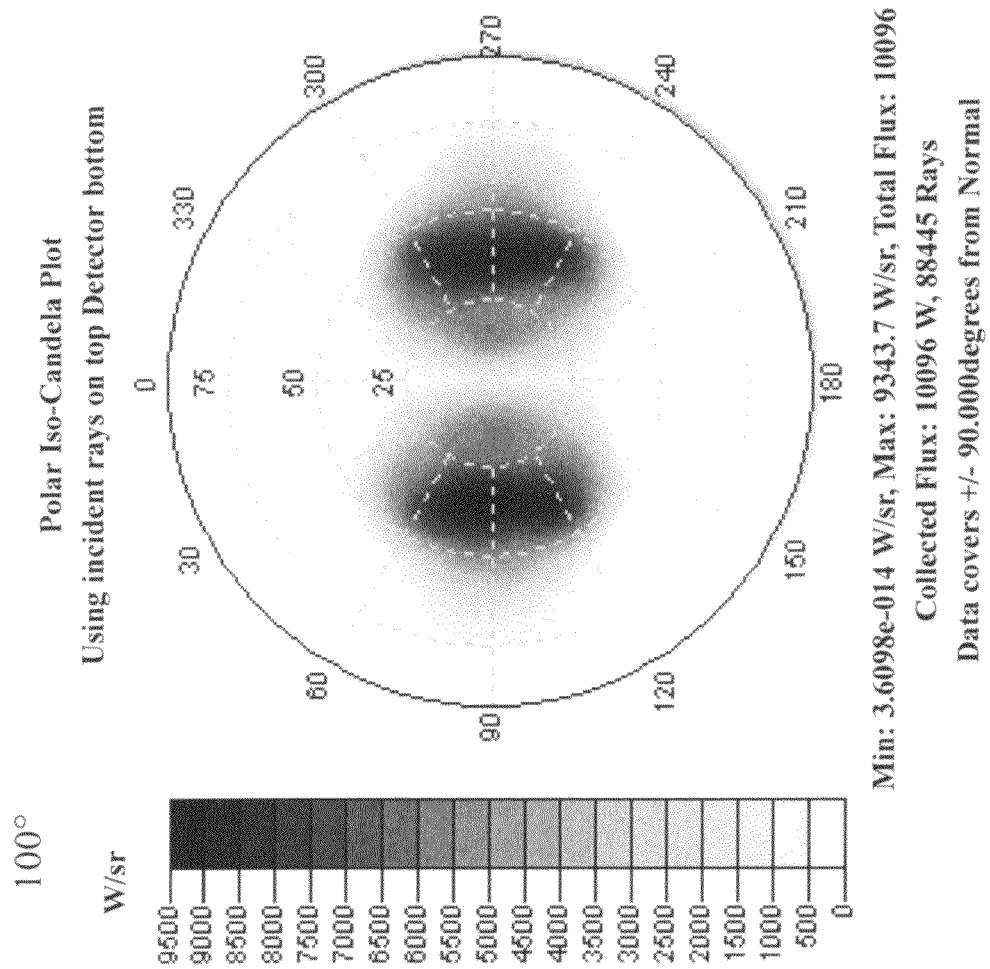
Figure 3F:
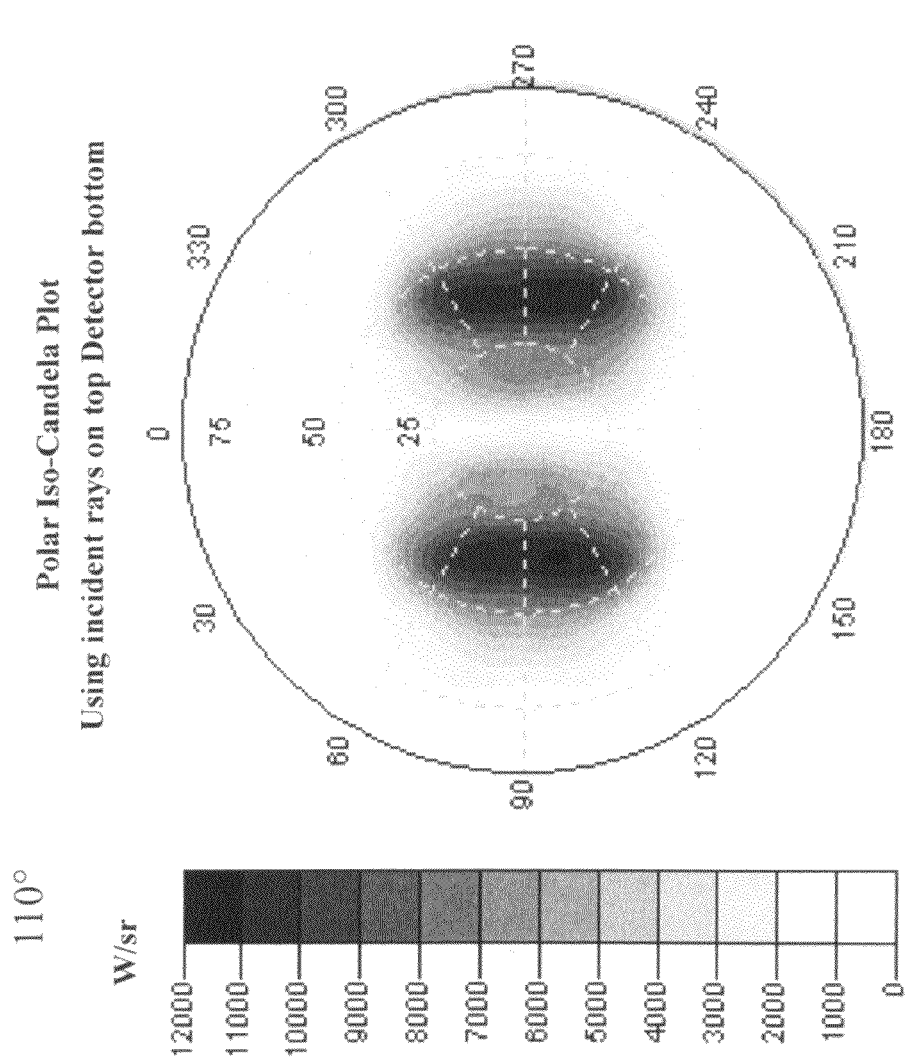
Figure 3G:
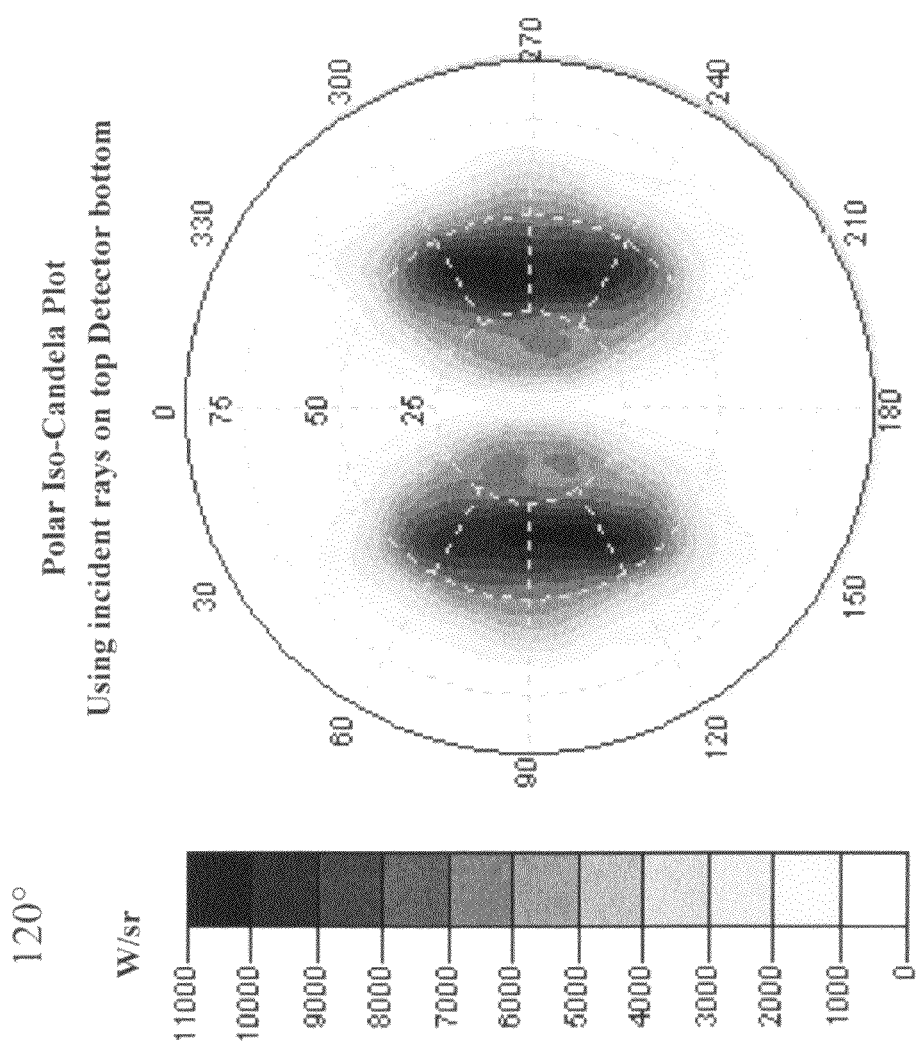
Figure 4:
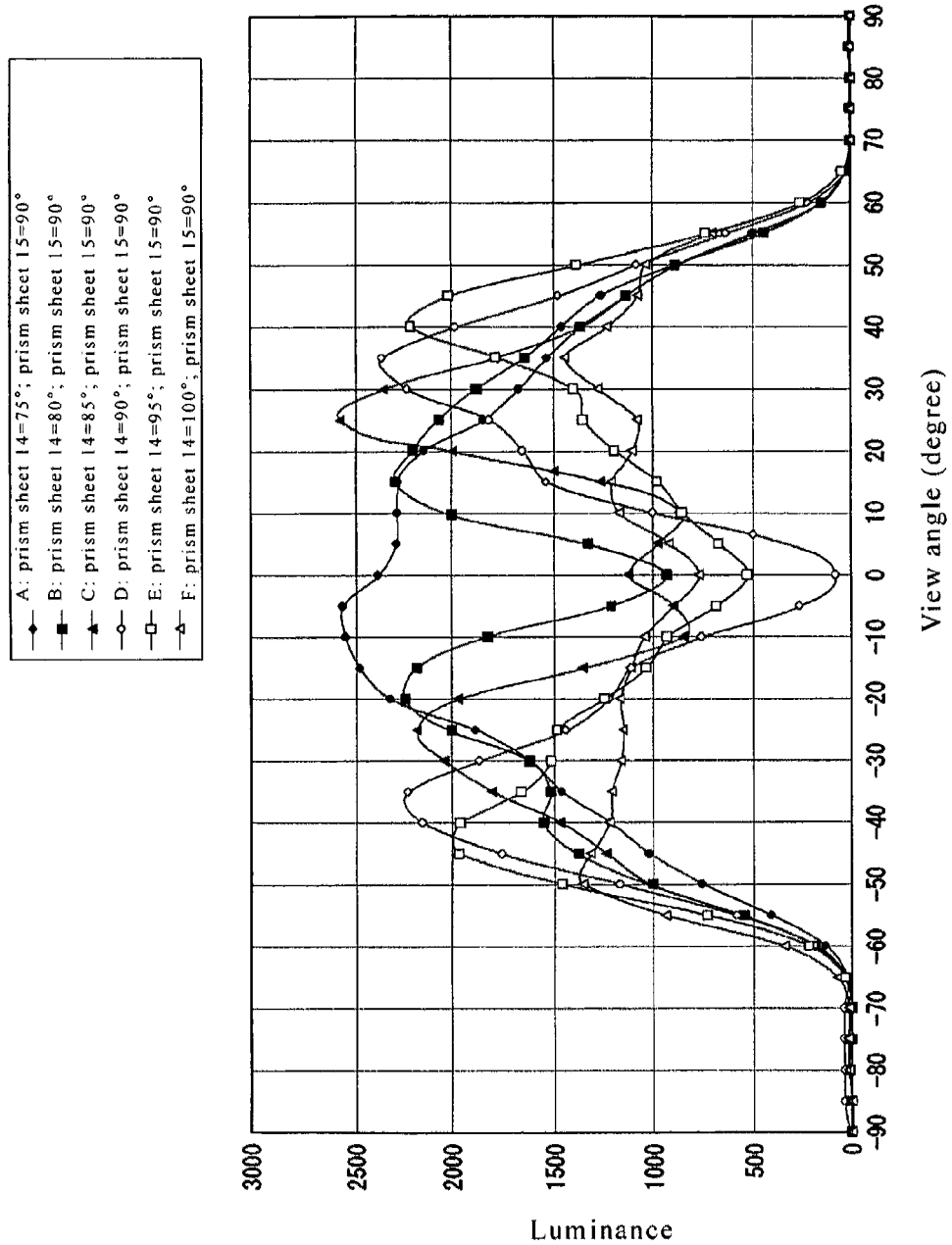
FIG. 4 is a graph showing the luminance directivity characteristic varying with the prism angle of the first prism sheet.
Figure 5:
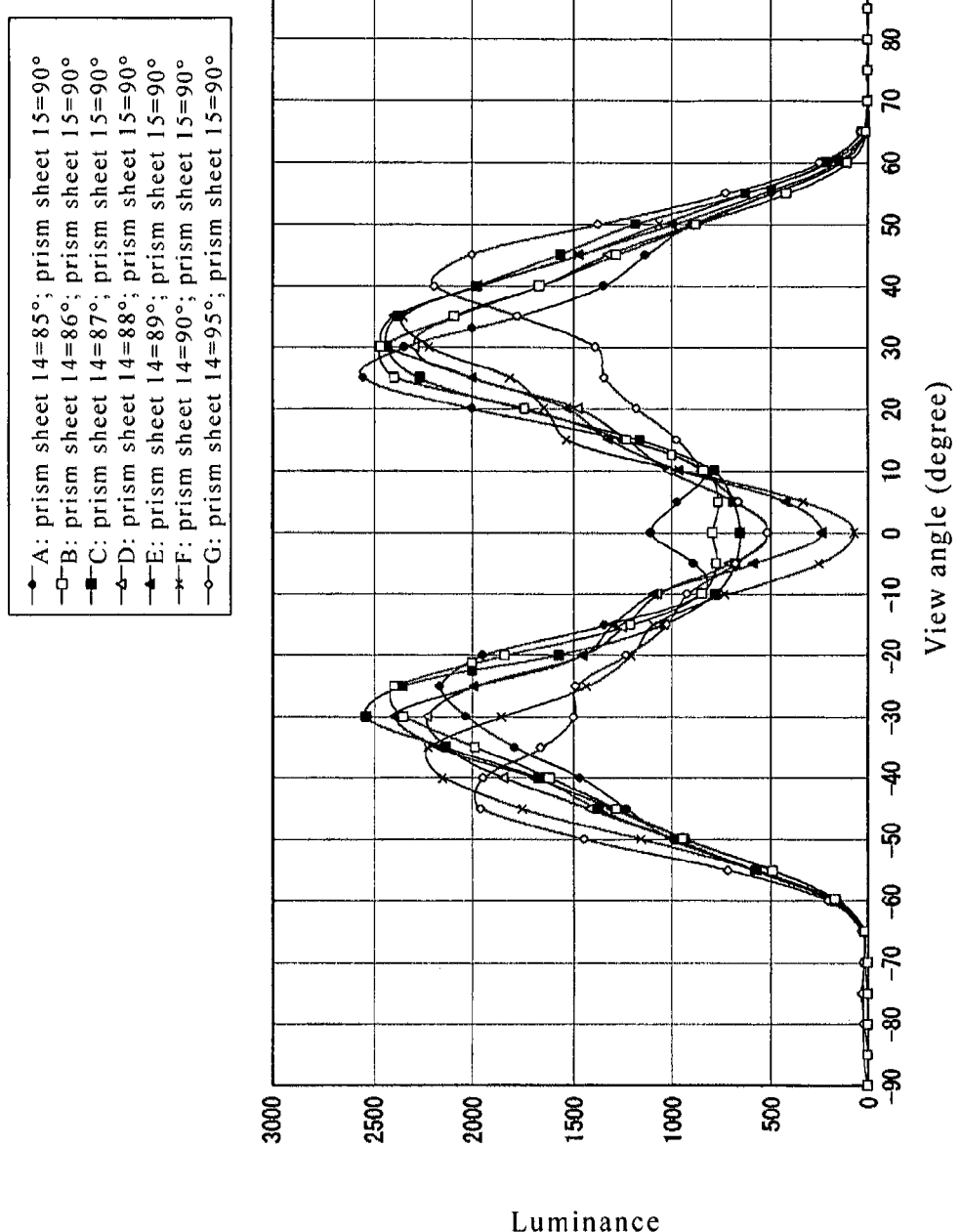
FIG. 5 is a graph showing the luminance directivity characteristic varying with the prism angle of the first prism sheet.

First of all, the horizontal luminance directivity characteristic varying with the prism tip angle of the two prism sheets constructed as the structure shown in FIG. 1 is simulated, where the simulation results are shown in FIGS. 4 and 5. FIG. 4 shows the case in which the prism tip angle of the second prism sheet 15 is fixed to 90°, and the prism tip angle of the first prism sheet 14 is varied from 75° to 100° with an increment of 5°. In more specifics, FIG. 5 shows the case in which the prism tip angle of the second prism sheet 15 is also fixed to 90°, and the prism tip angle of the first prism sheet 14 is varied from 85° to 95° with an increment of 10. FIGS. 4 and 5 show that high luminance and high light-collimating properties can be obtained when the prism tip angle of the first prism sheet 14 is ranged from 80° to 95°, preferably from 89° to 90°.

Figure 6:
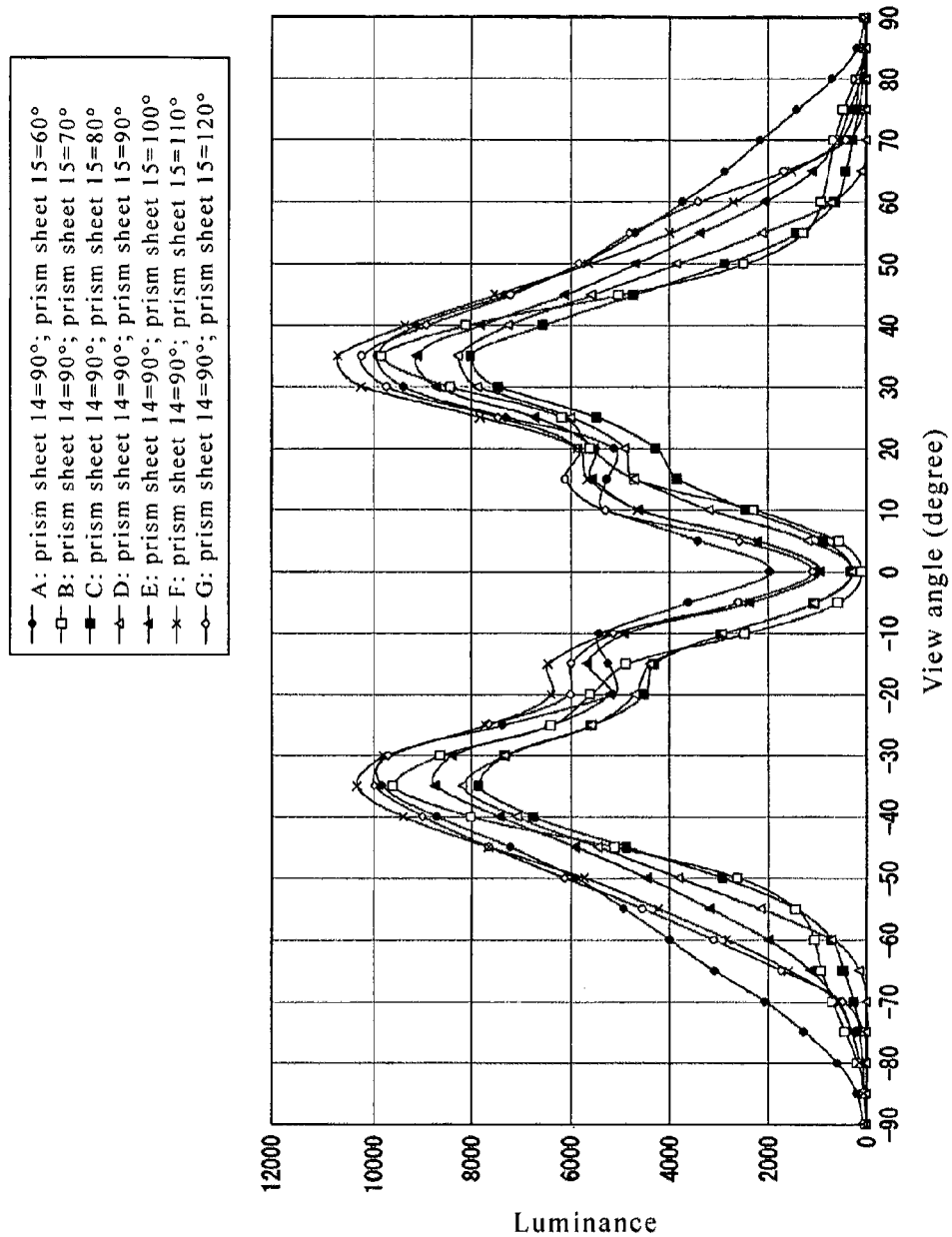
FIG. 6 is a graph showing the luminance directivity characteristic varying with the prism angle of the second prism sheet.

In the same manner, FIGS. 3A to 3G show the case in which the prism tip angle of the first prism sheet 14 is fixed to 90°, while the prism tip angle of the second prism sheet 15 is respectively varied from 60° to 120°. Furthermore, FIG. 6 shows the luminance distribution of a cross-section taken along a direction of 90° to a direction of 270°. Based upon the simulation results as shown in FIGS. 3A-3G and FIG. 6, a relatively high brightness and light-collimating property is obtained while the prism tip angle of the second prism sheet 15 is ranged from 70° to 110°, preferably from 80° to 100°.

In the present invention, in order to prevent the optical adhering of the first prism sheet 14 and the second prism sheet 15, the respective surfaces of the prism sheets on which no prism is formed are matte-finished. Similarly, the influence on the luminance directivity characteristic by the matte-finished surface of the prism sheet is also measured.

Figure 8:
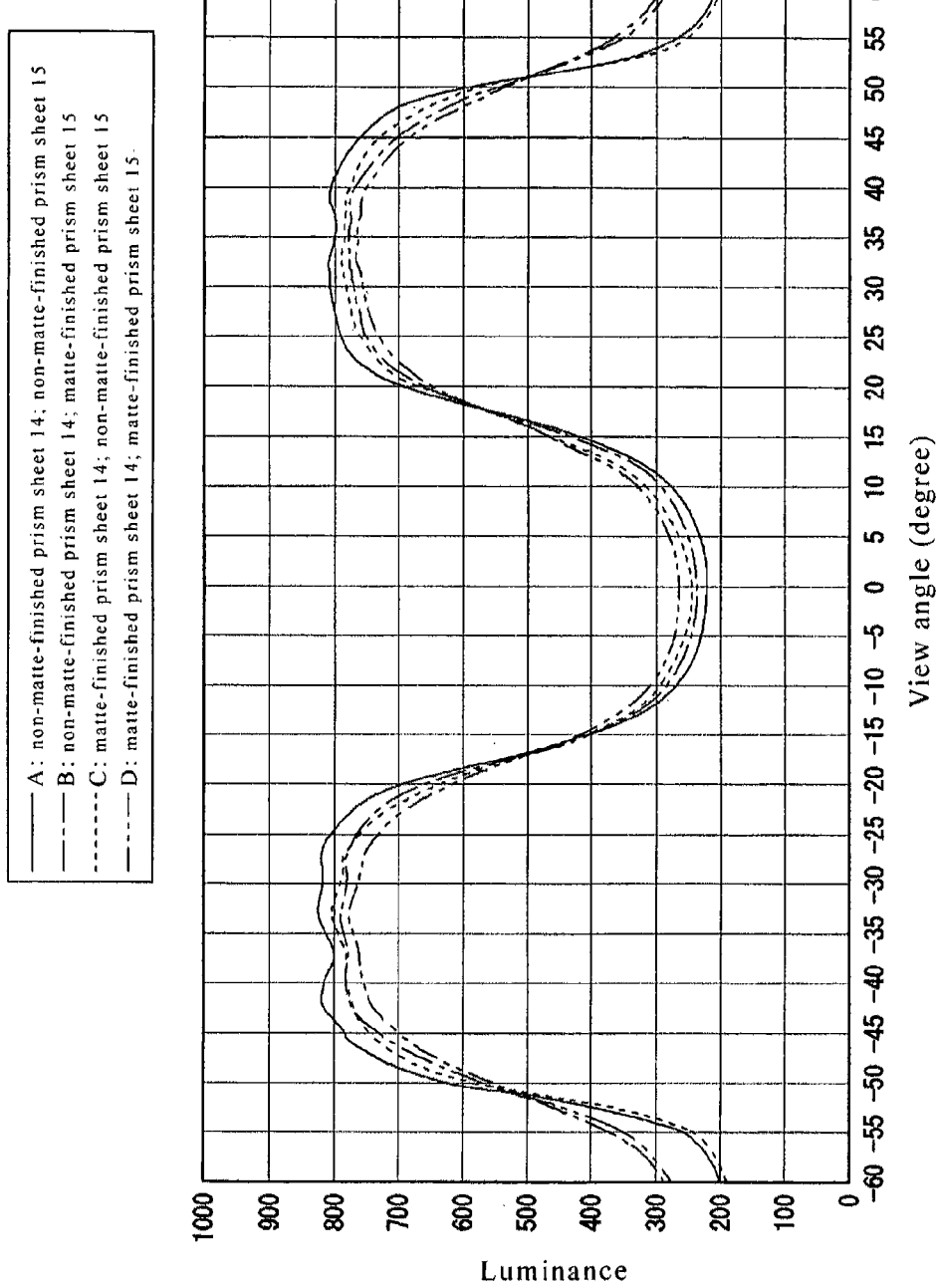
FIG. 8 is a graph showing the luminance directivity characteristic of a matte-finished prism sheet.

FIG. 8 shows the measurement results of the luminance directivity characteristic of the structure shown in FIG. 1 in which the prism tip angles of the first prism sheet 14 and the second prism sheet 15 are both 90°, and the faces without prism formation are matte-finished and are not matte-finished. Based on the comparison result, it is found the high luminance and high light-collimating properties can be obtained when only the first prism sheet 14 is matte-finished. In addition, although the luminance is the highest when the first and the second prism sheets 14, 15 are not matte-finished, it is not preferable since the air layer therebetween would disappear owing to the optical adhering thereof.

For the display having the backlight device of the present invention, when using a reflective polarizer (for example, the commercially available DBEF by 3M, the commercially available APCF by Nitto Denko Corporation), the luminance distribution may be deviated in the clockwise or anti-clockwise direction from the transmission axis of the polarizer or the transmission axis of the reflective polarizer.

Figure 7:
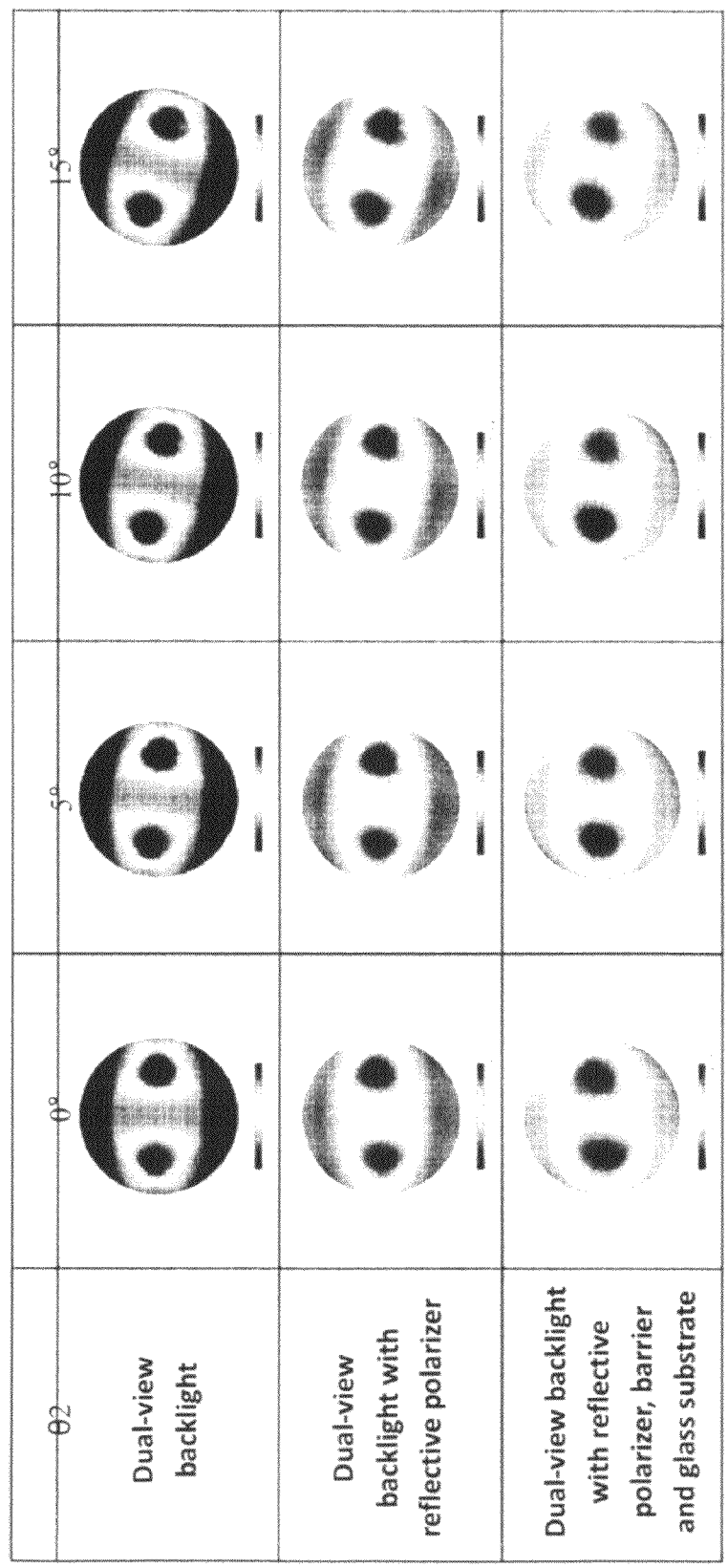
FIG. 7 is a diagram showing the luminance directivity characteristic varying with the rotation of the two prism sheets with respect to the transmission axis of a polarizer or a reflective polarizer.
Figure 9:
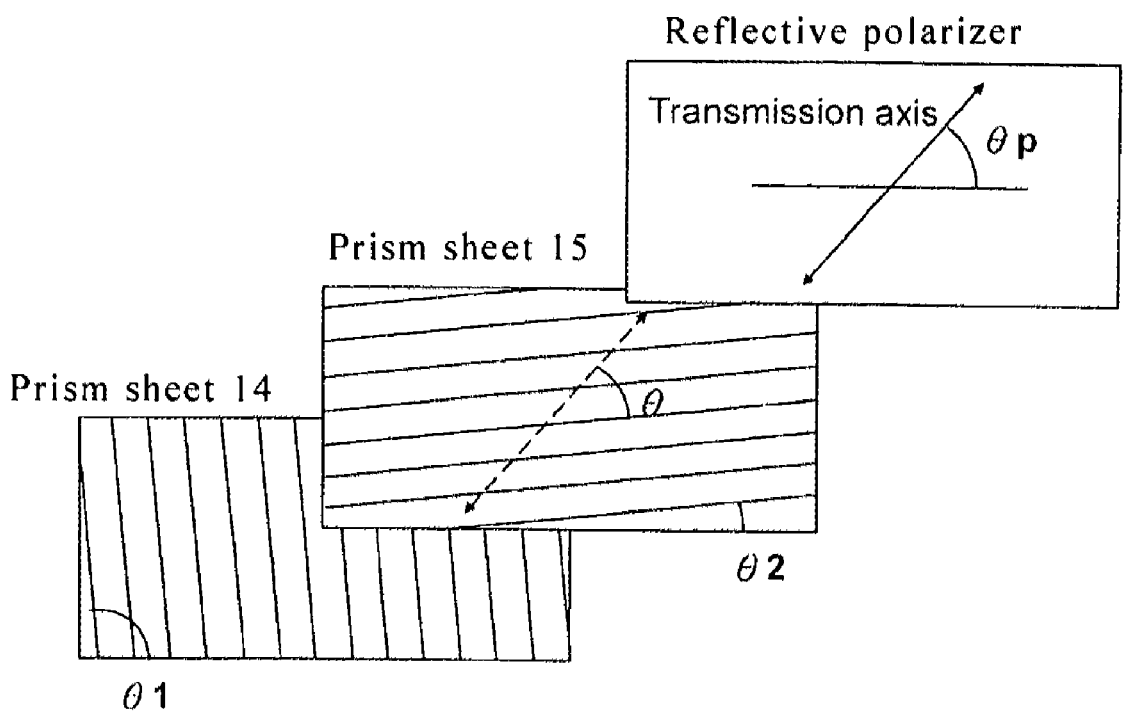
FIG. 9 schematically shows the positional relationship of the two prism sheets and the transmission axis of a polarizer or a reflective polarizer.
Figure 10:
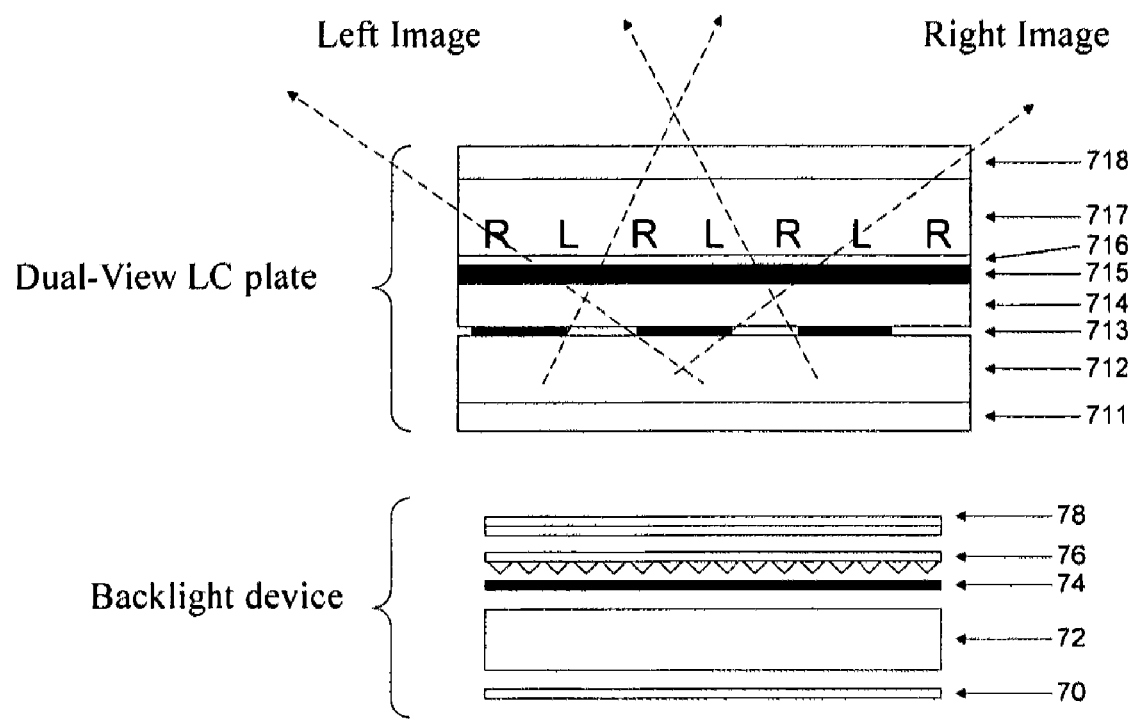
FIG. 10 is a diagram showing the structure of a dual-view display.
Figure 11:
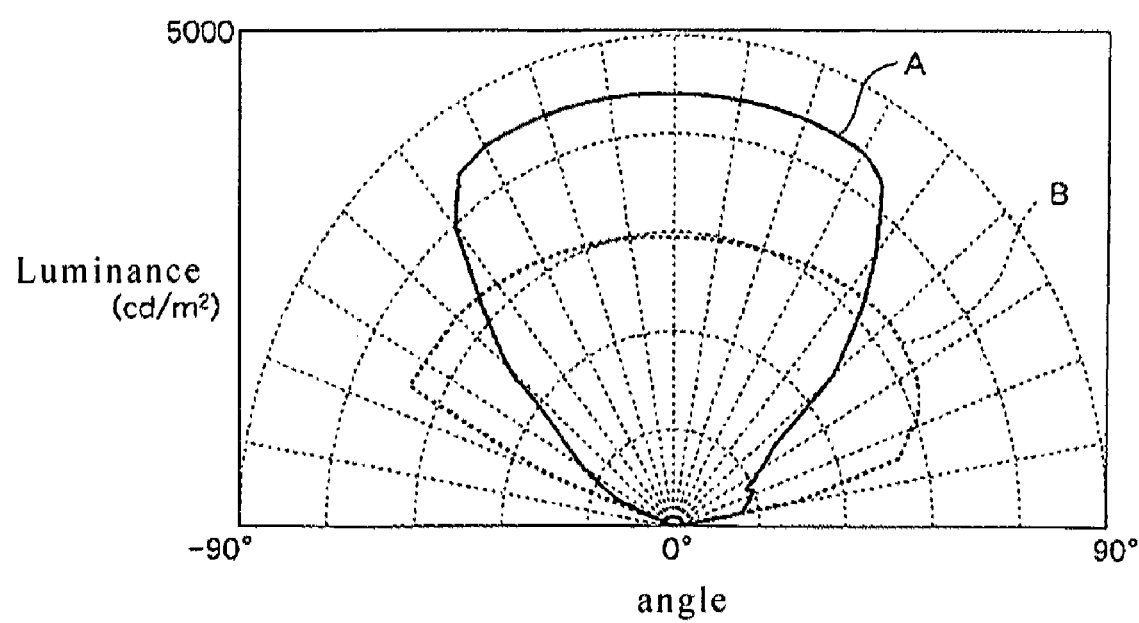
FIG. 11 is a diagram showing the luminance directivity characteristic of a conventional dual-view display.

In regard of the above, the luminance directivity characteristic of the prism sheets rotating about the transmission axis of the polarizer or the transmission axis of the reflective polarizer is measured, as shown in FIG. 9. In this case, the axes of the two prism sheets (i.e. the ridge line of the prism) are orthogonal to each other. FIG. 7 shows the measurement result of the mentioned structure. As shown in FIG. 7, it is apparent that a desirable luminance distribution can be obtained by rotating the prism sheets ±30°~±45° about the transmission axis of the polarizer or the transmission axis of the reflective polarizer.

Since the backlight device of the present invention has an improved light-collimating property and a relatively high brightness, it is applicable efficiently for dual-view displays, especially automotive car navigation (television) devices.

What is claimed is:

1. A dual-view display comprising:
a liquid crystal panel showing a liquid crystal screen;
a polarizer having a transmission axis; and
a backlight device comprising:
   a light source;
   a light-guide plate guiding and diffusing a light from the light source;
   a diffusing sheet disposed between the light-guide plate and the liquid crystal panel;
   a first prism sheet disposed between the diffusing sheet and the liquid crystal panel and a second prism sheet disposed between the first prism sheet and the liquid crystal panel, wherein the first prism sheet has a prism forming surface facing the diffusing sheet and the second prism sheet has a prism forming surface facing the liquid crystal panel, and wherein there is no other prism sheet between the second prism sheet and the liquid crystal panel; and
   a reflective sheet;
   wherein the first prism sheet has a ridge line and has a tip angle ranging from 80° to 95°, and the second prism sheet has a ridge line and has a tip angle ranging from 70° to 110°, wherein the ridge line of the first prism sheet is orthogonal to the ridge line of the second prism sheet, and wherein the first prism sheet and the second prism sheet are disposed in such a way that the respective ridge lines thereof are orthogonal to each other and are rotated an angle ranging from +35° to +45° or −35° to −45° with respect to the transmission axis of the polarizer wherein the polarizer is a polarizer of reflective type.

2. The dual-view display according to claim 1, wherein the tip angle of the first prism sheet ranges from 89° to 90°.

3. The dual-view display according to claim 1, wherein the tip angle of the second prism sheet ranges from 80° to 100°.

4. The dual-view display according to claim 1, wherein the first and second prism sheets have a respective plane surface facing to each other, and either one or both of the surfaces are matte-finished.

5. The dual-view display according to claim 4, wherein the surface of the first prism sheet is matte-finished.

6. A liquid crystal display device comprising the dual-view display according to claim 1.

7. An automotive dual-view display using the liquid crystal display device of claim 6.

8. A dual-view display comprising:
a liquid crystal panel;
a polarizer having a transmission axis; and
a backlight device, comprising:
   a light source;
   a light-guide plate guiding and outputting a light from the light source to an output side of the light-guide plate;
   a first prism sheet and a second prism sheet disposed at the output side of the light-guide plate, wherein the first prism sheet has a first prism forming surface facing in a direction towards the light-guide plate, and the second prism sheet has a second prism forming surface facing in a direction away from the light-guide plate and towards the liquid crystal panel, wherein there is no other prism sheet between the second prism sheet and the liquid crystal panel, wherein the first prism forming surface and the second prism forming surfaces face different directions and away from each other, wherein the first prism sheet has a first ridge line, and the second prism sheet has a second ridge line orthogonal to the first ridge line, and wherein the first ridge line and the second ridge line are rotated an angle ranging from +35° to +45° or −35° to −45° with respect to the transmission axis of the polarizer wherein the polarizer is a polarizer of reflective type.

9. The dual-view display according to claim 8, wherein the first prism sheet is disposed between the light-guide plate and the second prism sheet.

10. The dual-view display according to claim 9, further comprising a diffusing sheet disposed between the first prism sheet and the light-guide plate.

11. The dual-view display according to claim 10, further comprising a reflective sheet disposed at a side of the light-guide plate opposite to the output side.

12. The dual-view display according to claim 8, wherein the first and second prism sheets have respective planar surfaces facing each other, and at least one of the planar surfaces is matte-finished.

13. The dual-view display according to claim 8, wherein the first prism sheet has a tip angle ranging from 80° to 95°, and the second prism sheet has a tip angle ranging from 70° to 110°.

14. A display device in an automobile, comprising the dual-view display of claim 8.

* * * * *